May 4, 1954 W. T. BELL ET AL 2,677,442
SELECTIVE FLUID PRESSURE BRAKE WITH EMERGENCY WEIGHT OPERATOR
Filed July 16, 1951 3 Sheets-Sheet 1

Inventors
WILLIAM THOMAS BELL
ARTHUR CROMPTON
By
Young, Emery + Thompson
Attorneys Patented May 4, 1954

2,677,442

UNITED STATES PATENT OFFICE 2,677,442

SELECTIVE FLUID PRESSURE BRAKE WITH EMERGENCY WEIGHT OPERATOR

William T. Bell and Arthur Crompton, Lincoln, England

Application July 16, 1951, Serial No. 236,924

5 Claims. (Cl. 188—105)

This invention relates to brakes of mine hoists, winders, hauling devices and other rotating machines.

An object of this invention is to provide in positive power brakes as set forth in U. S. Patent No. 2,554,235, and in all other brakes to which the invention can be applied, suitable means for producing, in the case of double drum winders, hauling devices and the like, suitable braking torques for the heavier duties, while means are available to reduce the braking torque to the amount required for the light duties, thereby reducing shocks, high stresses and other undesirable features associated with winding, hauling, etc.

Another object of this invention is to provide in a rope winder means for producing braking torque which will on the one hand meet any requirements or regulations under test conditions and also in normal operation, while on the other hand, will produce in emergency operation such restrained braking torque which may be prescribed in order to minimize or avoid slip between the rope pulley and its rope.

A further object is to provide in winders, mine hoists, hauling devices and other rotating machines, means to alter the amount of braking when it is necessary or desirable such as where the brakes are used in conjunction with an automatic winder.

Still another object of this invention is to provide two pressure operated pistons for applying the brakes, whereas one only is used as described in U. S. Patent No. 2,554,235.

A still further object of the invention is to add to the apparatus disclosed in U. S. Patent No. 2,554,235 a single acting piston with its cylinder, which may be an extension and attached to the double acting piston and cylinder described as the positive power brake engine in said Patent No. 2,554,235.

It is customary, where conditions make it desirable, or necessary, to provide hoists or winders with two drums, in which case one or both of the drums are driven through clutches. When one of the drums is declutched and held stationary, the brakes of the other drum are required to have sufficient capacity or power to meet all the requirements of winding in this unbalanced condition. When the brakes of both drums are used in unison, the combined braking torque is in operation. The drums are therefore both engaged and winding "in balance," and the resulting maximum out of balance torque is usually much less than in the former conditions of unbalanced winding. In these conditions the combined braking torque of both drums is usually far in excess of that required, resulting in high rates of deceleration, shocks to men riding, and undesirable stresses imposed on the equipment. It is therefore desirable to vary the braking torque to suit varying conditions of winding.

According to this invention, brakes for mine hoists, winders, hauling devices and other rotating machines, incorporate means for automatically varying the torque for the brakes so that suitable braking torques are provided for the heavier duties and reduced torques for the lighter duties.

The invention will be clearly understood from the following description aided by the accompanying drawings, in which.

Figure 1:
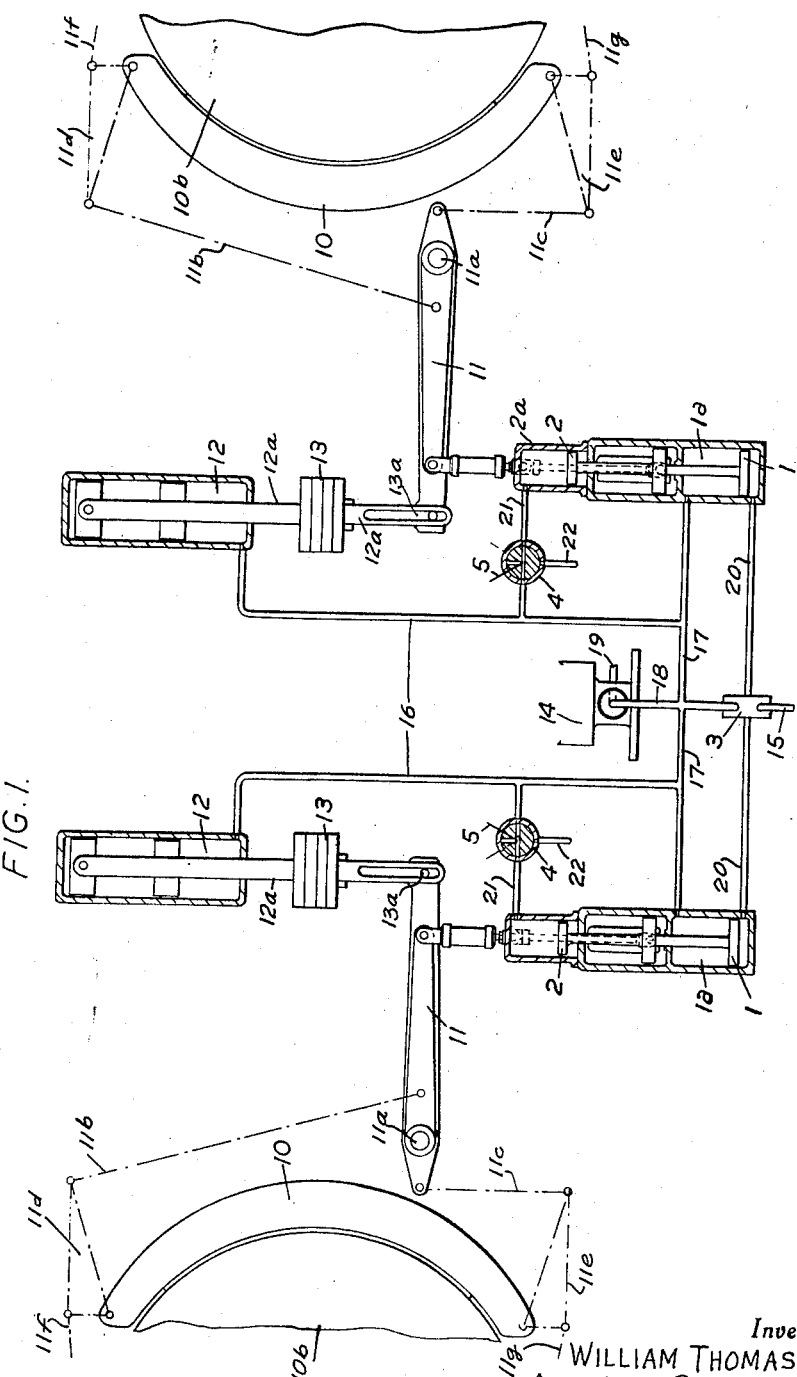
Figure 1 is a diagrammatic view showing one example of carrying the invention into effect applied to a double drum winder.

When the invention is applied to a double drum winder, as shown in Figure 1, the piston 1 of a double acting cylinder 1a is so proportioned to give the required braking for the condition of "balanced winding."

As shown, the rod of each piston 1 is pivotally connected to a brake lever 11 mounted on the fulcrum pivot 11a. Brake links 11b and 11c connect the brake lever 11 to bell cranks 11d and 11e pivoted on brake shoe 10. Other links 11f and 11g connect the bell cranks 11d and 11e to the second brake shoe 10a.

Each brake lever 11 is also connected by means of a pin and slot connection 13a with the rod 12a of an emergency brake actuating weight 13 and of the piston of a cylinder 12.

It will be noted that cylinder 12 is connected through conduits 16, 17, 18 and accumulator 14 to the supply conduit containing fluid under pressure.

The area of the piston in cylinder 12 is such that with the pressure of the fluid supplied thereto, the weight 13 will be lifted. Upon failure of the fluid pressure supply, the weight 13 will be dropped to apply the brake shoes 10 and 10a to the brake drum 10b.

Cylinders 1a are so connected to the fluid pressure supply that the pistons 1 will be maintained in brakes "on" position. For this purpose, the upper ends of the cylinders 1a are connected to conduits 17 which are supplied with fluid under pressure which serves to urge the piston 1 downwardly to brake "on" positions. To enable the pistons 1 to be moved downwardly, the lower ends of the cylinders 1a are connected through pipes 20 to valve 3 which is in position to connect with the exhaust pipe 15.

When it is desired to release the brakes, valve 3 is shifted to a position to connect pipes 20 with conduit 18 and to disconnect pipes 20 with exhaust 15. This applies the fluid under pressure to both sides of pistons 1 which neutralizes the effect of the pressure fluid on the piston and releases the brakes.

Of course, when the brakes are to be applied, valve 3 is shifted to relieve the fluid from the underside of pistons 1 through pipes 20 to the exhaust 15.

In order to provide additional braking pressure, additional braking pistons 2 are mounted on the piston rods carrying pistons 1 and are reciprocable in cylinders 2a. The upper ends of cylinders 2a are connected through pipes 21 to conduits 16 which communicate with the fluid under pressure.

A valve 4 associated with clutch actuating lever 5 is provided in each pipe 21 to supply pressure fluid to the cylinders 2a and to discharge fluid from cylinders 2a through exhausts 22.

The second piston 2 is proportioned to give such extra braking effort as required for "unbalanced winding." In place of the valve 4, the normal operating valve 3 may be so arranged that when balanced winding is effected, pressure is not applied to the second piston 2. Any movement of the clutch, clutch operating lever 5, etc. which is a preliminary to unbalanced winding, admits pressure to the second piston 2, thereby providing the extra braking required. Where two sets of brake engines are provided, this arrangement permits either or both sets to have the extra pressure available as desired.

An automatic winder performs its normal duty cycle with the brakes automatically operated. It is a requirement, when a conveyance has been raised in a shaft, for it to be dropped onto keeps. This requires the conveyance to be raised to a certain position and the keeps are then inserted. The conveyance has then to be lowered to rest on the keeps by reducing the applied braking torque.

Figure 2:
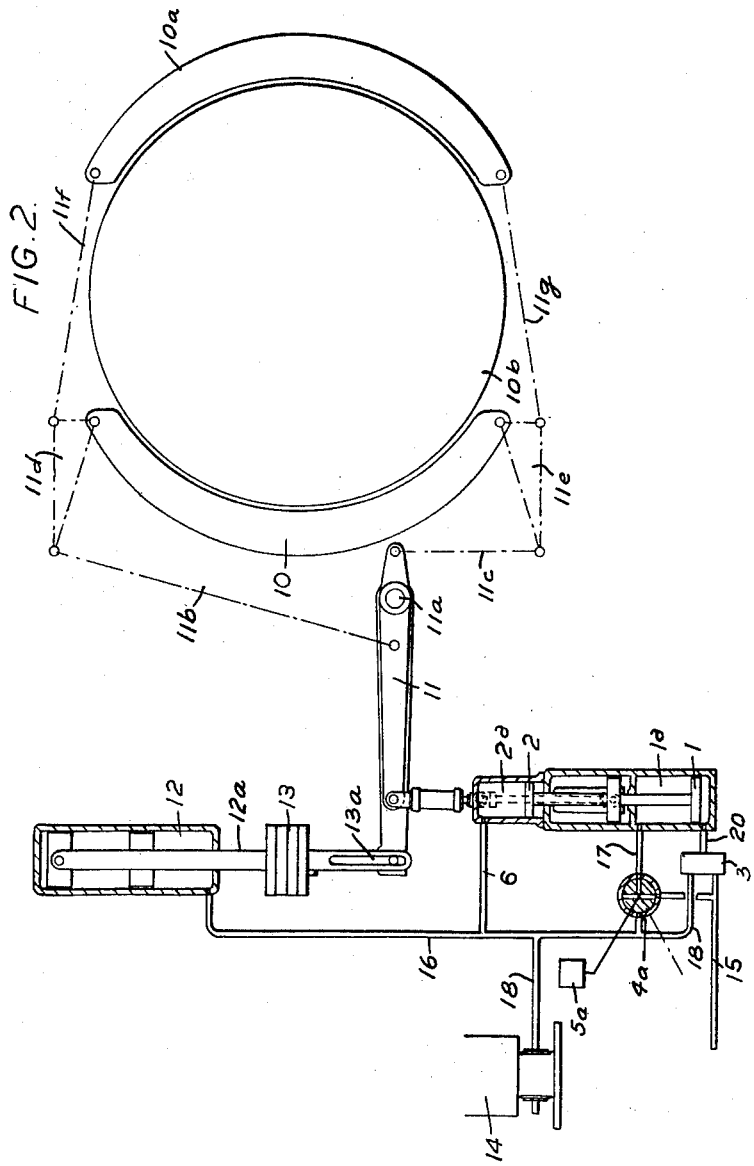
Fig. 2 is a similar view showing an example applied to an automatic winder.

When the invention is thus applied to an automatic winder, as shown in Figure 2, one method is to provide the second piston 2 and cylinder 2a previously described.

The system of Fig. 2 is similar to that of Fig. 1 with the exception that valve 4 is interposed in the pipe 17 between the upper end of cylinder 1a and the pressure fluid supply, and the upper end of cylinder 2a is connected by pipe 6, with no valve, to pipe 16.

A control or operating valve 3 as shown in Fig. 1 is fitted for the operation of the double acting piston 1, a constant pressure supply being admitted to the second piston 2 so that when the brakes are normally operated to brakes "on" the pressure on both pistons 1 and 2 provides the maximum pressure required.

A valve 4a is inserted in the pressure supply line 17 to brakes "on" of the double acting cylinder 1a. This valve 4a is operated by a solenoid or suitable device 5a. When the conveyance arrives at a position when the "keeps" can be inserted, the solenoid 5a is actuated to operate the valve 4a. By these means, the pressure is relieved on the piston 1, thus reducing the braking torque. Such reduction will permit the conveyance to drop onto the keeps, which is a requirement when winding. As an alternative, the valve 4a may be inserted in the pressure pipe 6 to the single acting cylinder 2a producing a similar result.

The operation of the apparatus of Fig. 2 is very similar to that of Fig. 1.

Where a rope winder is used, it is necessary to provide brakes giving a braking torque which will meet the prescribed test conditions for normal operation. Alternatively, the emergency operation of the brakes requires to produce a braking torque different from, and generally less than that for such test conditions and it is important to eliminate or reduce any tendency to slip between the rope and its driving wheel.

When the invention is applied to a rope winder, the single acting piston 2 and cylinder, described above, are provided in conjunction with the double acting cylinder and piston 1.

The combined braking effort of both pistons provide the maximum for normal and test conditions, while the braking effort of one of the pistons provides that required for emergency conditions of operation.

Figure 3:
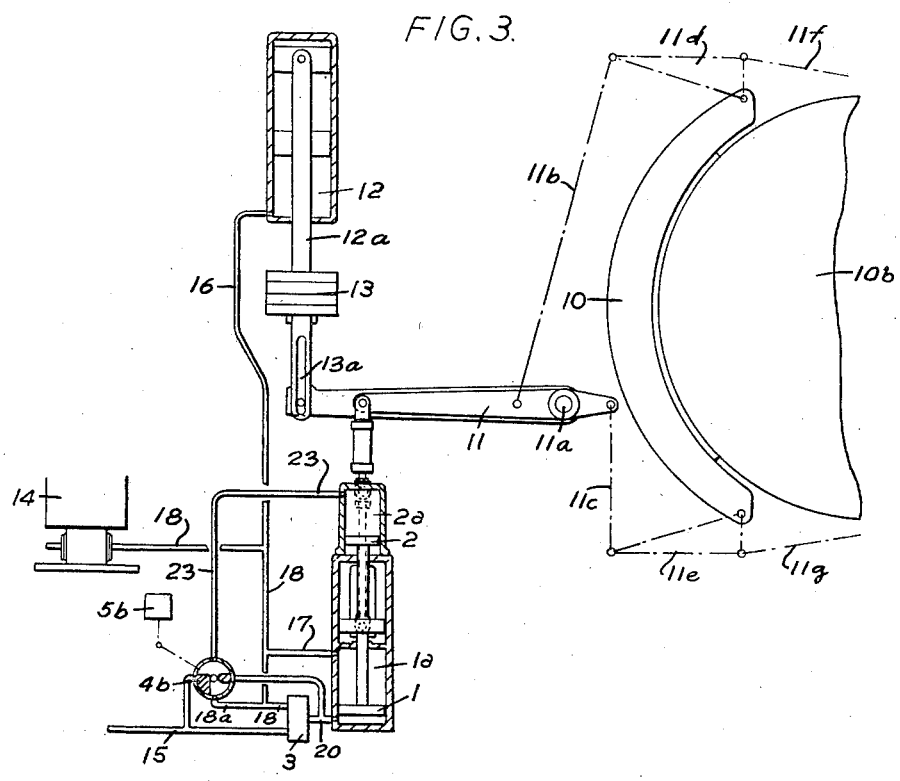
Fig. 3 is another diagrammatic view showing an example applied to a rope winder.

There are various means of arranging the valve, piping and lever connections, one such means being as follows and illustrated in Figure 3.

The accepted type of control valve is fitted to operate the double piston with piping as described in connection with Figs. 1 and 2.

A pressure supply is connected from 14 through 18, 18a, valve 4b and 23 to the single acting cylinder 2a. This supply is controlled by means of a valve 4b which latter can be actuated by the movement of a solenoid or other tripping device 5b. The movement takes place in emergency conditions.

The valve 4b also controls the pressure in the direction of brakes "off." An emergency operation of the tripping device 5b relieves the pressure from the single acting cylinder 2a and also the pressure in the direction of brakes "off" by connecting both 20 and 22 to exhaust. The separate valve 4b described may be combined with the normal operating valve 3. Furthermore, the piping may be connected so that the pressure to brakes "on" is relieved from the double acting piston 1 instead of the single acting piston 2 as described above.

With either of these arrangements as applied to a rope winder, when emergency operation is initiated by the tripping device 5b, it is not possible to apply greater braking effort which is only available in normal operation.

When it is required to have the normal or greater braking available during the conditions of emergency operation, the valves, pipe and lever connections can be arranged accordingly.

Figure 4:
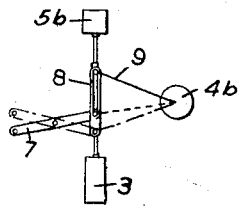
Fig. 4 is a detail view of the control mechanism.

The valve 4b effecting emergency operation which is actuated by the tripping device 5b is arranged to operate in association with the normal operating valve 3 as illustrated in Figure 4.

When the emergency valve 4b operates the normal valve 3 and its operating lever is in the brakes "off" position, the normal valve operating lever 7 has attached a slotted link 8 or similar arrangement to permit a certain limited movement of the operating lever 9 of the emergency valve 4b. This movement is sufficient to produce emergency braking. The movement of the driver's control lever will move the normal valve 4 to the brakes "on" position. This will move the emergency valve 4b by means of the slotted link 8, a further amount. Such extra movement of the emergency valve 4b reconnects the pressure supply to the cylinder from which it has been shut off, but the pressure to brakes "off" remains exhausted. Thus the braking torque is reinforced to the larger amount.

In each of the examples described, the single acting cylinder 2a with its piston 2 is attached to the double acting cylinder 1a and its piston 1. An alternative arrangement is to make the cylinder 2a and piston 2 separate and the latter will be connected to a convenient point of the brakes, such as the main horizontal lever 11, to which the piston 1 will also be connected.

The invention can be applied whether air, steam, oil or other fluid is used as the pressure medium.

With all the above applications of the invention for the purposes described, emergency weights can be fitted as described in connection with Fig. 1 and in Patent No. 2,554,235, thus giving the same measure of safety with pressure failure.

The invention can also be applied in the manner described to the positive power brake unit described in Patent No. 2,490,941.

We claim:

1. A fluid pressure operated brake apparatus for mine hoists, winders, hauling devices and similar rotating machines comprising a brake actuating member, a cylinder, a double acting piston in the cylinder, a piston rod carrying said piston, means connecting the piston rod to the brake actuating member for shifting the latter, a conduit for supplying fluid under pressure, first and second means connecting each end of the cylinder with said conduit for applying fluid under pressure to both sides of the piston, a valve in the first means, said valve having an exhaust opening and being operable to shut off the pressure fluid from said one end of the cylinder and open said one end of the cylinder to exhaust to cause the piston to move towards said one end of the cylinder and shift the brake actuating member to apply the brakes, a second cylinder, a second piston in the second cylinder and connected to said piston rod, third means connecting one end of the second cylinder to the supply conduit for applying fluid pressure to the second piston to urge it to move in a direction to shift the brake lever to apply the brakes, and a second valve in one of said second and third means operable for shutting off the supply of fluid under pressure to the cylinder end supplied and operable for releasing fluid from the last mentioned cylinder end.

2. An apparatus according to claim 1 in which the second valve is positioned in the means connecting the conduit to the second cylinder.

3. An apparatus according to claim 1 in which the second valve is positioned in the second means connecting the first cylinder to the supply conduit.

4. An apparatus according to claim 1 in which the second valve is positioned in the second means connecting the first cylinder to the supply conduit, and a solenoid for actuating said second valve.

5. An apparatus according to claim 1 in which the second valve is of the type having four ports and is positioned in the means connecting the supply conduit to the second cylinder, one of the ports of said valve being connected to the exhaust and another of the ports of said valve being in communication with the first means between the first cylinder and the first valve.

References Cited in the file of this patent

UNITED STATES PATENTS

| Number | Name | Date |
|---|---|---|
| 1,646,718 | Wilkinson et al. | Oct. 25, 1927 |
| 2,490,941 | Bell et al. | Dec. 13, 1949 |
| 2,554,235 | Bell et al. | May 22, 1951 |

FOREIGN PATENTS

| Number | Country | Date |
|---|---|---|
| 586,294 | Great Britain | Mar. 13, 1947 |
| 618,816 | Germany | July 7, 1933 |